United States Patent [19]

Berner

[11] 4,262,209
[45] Apr. 14, 1981

[54] SUPPLEMENTAL ELECTRICAL POWER GENERATING SYSTEM

[76] Inventor: Charles A. Berner, 12900 Bellerive Estate Dr., Creve Coeur, Mo. 63141

[21] Appl. No.: 15,456

[22] Filed: Feb. 26, 1979

[51] Int. Cl.$^3$ .................... F02D 29/06; F02N 11/06; H02J 3/40; H02P 9/00
[52] U.S. Cl. .................................. 290/7; 290/2; 290/40 B; 307/44; 307/47; 307/68; 307/127
[58] Field of Search ................... 290/2, 5, 7, 8, 40 B; 323/5, 103, 104, 115–118; 307/44, 47, 53, 57, 64, 127, 131, 68

[56] References Cited

U.S. PATENT DOCUMENTS

| | | | |
|---|---|---|---|
| 1,167,119 | 1/1916 | Scherbius | 307/47 |
| 1,506,750 | 9/1924 | Hellmund | 307/131 |
| 2,780,733 | 2/1957 | Chyba | 307/53 |
| 2,790,090 | 4/1957 | Hinde et al. | 290/4 A |
| 3,009,067 | 11/1961 | Janeczko et al. | 290/38 C |
| 3,243,598 | 3/1966 | Grillo | 307/68 |
| 3,518,445 | 6/1970 | Wichman | 290/30 |
| 3,636,414 | 1/1972 | McIntosh et al. | 307/131 |
| 3,678,284 | 7/1972 | Peters | 290/2 |
| 3,944,837 | 3/1976 | Meyers et al. | 290/2 |
| 3,946,242 | 3/1976 | Wilkerson | 363/136 |
| 4,121,271 | 10/1978 | Tsai | 307/127 |
| 4,150,300 | 4/1979 | Van Winkle | 290/4 R |

Primary Examiner—J. V. Truhe
Assistant Examiner—Shelley Wade
Attorney, Agent, or Firm—Kalish & Gilster

[57] ABSTRACT

Hydrocarbon fuel energy is converted to AC electrical energy by a new system utilized to supplement AC power for household and similar limited size loads in synchronism with existing AC utility service via pre-existing wiring between the load and the utility lines. The system has an externally excited commutator AC motor-generator driven by an internal combustion engine to provide AC power at a magnitude which is a function of the drive shaft velocity and degree of excitation. An exciter circuit provides excitation for the motor-generator to cause the generated AC power to be in phase with utility power. A load demand sensor senses current flowing through the wiring to the load, providing a control signal signifying magnitude of the current, thus measuring load power requirements. Control circuitry interconnected with the exciter circuitry and the engine is responsive to the control signal to control excitation for causing the generated supplemental power substantially to meet load requirements. The control circuitry also controls engine speed to provide sufficient engine power to meet these load requirements. Mechanical elements of the system are contained by an insulated, sound-proofed enclosure. Air is drawn into the enclosure for cooling of the motor-generator and for recovering heat from the engine and the engine exhaust. The heated air is ducted out of the housing for use in household heating, etc. Various circuit features, including a phase sensitive detector, ensure that electrical power generated by the system does not flow back to the utility service. The system starts and stops automatically according to power demand.

21 Claims, 6 Drawing Figures

SUPPLEMENTAL ELECTRICAL POWER GENERATING SYSTEM

BACKGROUND OF THE INVENTION

The present invention relates to apparatus such as portable generators for providing AC electrical energy for household and similarly sized loads and, more particularly, to a new system for supplementing household or similar AC electrical load requirements by conversion of hydrocarbon combustion energy.

The present invention is concerned with a system for supplementing AC power which is normally provided to a household or similar relatively small load by a conventional AC utility service, i.e., commercial power source, by a pre-existing power distribution network such as the wiring which normally connects the utility to household loads, such as for lighting, heating, operation of appliances, etc. The present invention is, therefore, not primarily concerned with providing auxiliary AC power in the event of failure of a utility service and is not fundamentally intended to serve as a so-called standby power source which typifies the purpose of prior art household electrical power generating systems.

Small, portable power plants including gasoline or other combustion engine drive alternators have been known for many years. These have attained a marked degree of sophistication in recent years.

For example, Papachristous U.S. Pat. No. 3,691,393 describes an engine driven generating system including an automatic starter for starting the engine in response to loss of power from a main supply, i.e., conventional utility service. Thus, the system disclosed therein is one of a standby nature to be utilized only in the event of interruption of the normal supply of electrical energy to a load. Such patent is merely representative of many teachings of the prior art of standby generator systems which are configured or adapted for providing standby electrical power in the event of failure of the normal utility power service.

On the other hand, engine-generator systems have been proposed, including automatic starting controls, for initiating operation thereof in the event of the connection of an electrical load to the engine-generator set. For example, Wichman U.S. Pat. No. 3,518,445 teaches an automatic starting control for an engine-generator which acts to start the engine automatically if a load (such as at least 40 watts) is connected to the generator. A system such as this is intended for use with mobile units such as boats, campers and the like where it is desired to provide AC power for the lights, radios and other appliances within the mobile unit where conventional AC utility service is unavailable.

The degree of sophistication of energy supplying system for totally providing electrical power requirements of a residential or other building in lieu of that otherwise provided by an AC utility service is evidenced by Peters U.S. Pat. No. 3,678,284 wherein a most sophisticated system is described for supplying electrical and thermal energy utilization systems of a building. This system is arranged in association with electrical power from a conventional external source whereby, under certain conditions, an electrical generator of the system is adapted to be utilized to supply the entire AC power requirements of certain loads in the building. The system automatically disconnects the electrical utility supply lines whenever the system is intended to provide the AC power for such loads.

The Peters system must, for power generating purposes, disconnect the AC power lines because the system is not adapted to provide AC power at the same frequency and phase as the utility source. Another significant limitation of the Peters system is that, even though not intended to be synchronous with the utility, the generator nevertheless must be tightly controlled as to speed since the frequency of current generated does vary with variations of generator speed. This requires a large generator having high inertia and intended to operate as nearly as possible at constant speed, regardless of the amount of power to be supplied thereby. Moreover, the amount of power delivered by the power source to the generator must, at all times, be capable of accommodating the maximum electrical load required of the generator. Although disadvantageous in these several respects, the Peters system does nevertheless provide the advantage of recovering exhaust heat from the engine which operates the generator. This heat is recovered as hot air or hot water for space heating and water heating purposes.

None of these various approaches of the prior art solve certain needs long existing in our society but which in recent years have become relatively acute and are now expected to remain so. It is appropriate, in providing a background for the present invention, to examine these needs and the various problems of the prior art which are concomitant aspects of these needs.

Persons having available to them a supply of combustible hydrocarbon fuel or fuels such as oil, gasoline, natural gas, producer's gas, liquified propane (LP) gas, kerosene or alcohol have available a source of energy which can be converted to electrical energy. Electrical energy is often more useful and more readily converted to work in our electrified society than other usable forms of energy. Even more importantly, the cost of converting such hydrocarbon fuels to electrical energy can be done at lower costs per kilowatt hour in many regions than would be the case if such electrical power were purchased from a utility.

In this regard, contemporary energy extraction, distribution and delivery of electrical power from hydrocarbon fired and nuclear fission fired boilers, as through use of pressurized steam by operating steam turbines which in turn drive electrical generators, utilizing the most modern techniques, provides at best a thermodynamic efficiency of 32–39 percent. Much of the remaining energy (61–68 percent) is, of course, irretrievably lost as waste heat and wastefully warms the outdoor air above power plant smokestacks, and warms rivers and streams which are partially diverted by many electric utilities for the purpose of conveniently carrying away the waste heat. But even though utilities may generate electrical power at these relatively high efficiencies, such power further must be transmitted over long distances utilizing extremely expensive, high voltage technology wherein transmission lines often operate at potentials of hundreds of thousands of volts. During transmission further losses occur.

It would be much more efficient to convert hydrocarbon fuel, such as by the burning of natural gas or LP gas and converting such combustion to electrical energy at the locality or installation wherein electrical energy is to be utilized and to locally recover the waste heat of such combustion and conversion for a useful purpose, rather than permitting the by-product heat otherwise irretrievably to be lost as in the commercial generation of electrical power.

Home owners and other users of electrical power who have available to them such hydrocarbon fuels would long ago have been able to more economically generate electrical power if the technology had been available. Electric generating plants of the prior art, utilizing hydrocarbon fuel in internal combustion engines operating in the Otto or Diesel power cycles and coupled to electrical generators, have been capable of producing electrical power with a thermodynamic efficiency of approximately 22–28 percent. This relatively lower efficiency has militated against the adoption and use of localized power generation capabilities by home owners and the like.

Furthermore, electrical generating apparatus of the prior art typically has not been capable of providing alternating current in precise phase synchronism with the electric power supplied by utility services except where engine speed is extraordinarily tightly regulated. Yet, even in the case of operation at precisely regulated speeds, engine and generator arrangements of the prior art have not been capable of operation in such a way that best fuel efficiency can be achieved over a highly variable load demand.

The attainment of such fuel efficiency and the prolongation of the apparatus life is believed to require the operation of a prime mover over a wide range of speed. But is this were attempted utilizing engine and generator arrangements typical of the prior art, the frequency of the alternating current provided by the generator would not be in synchronism with the frequency of utility power.

It must also be recognized that, where power generating equipment is to be attached to utility service lines, it is most desirable to preclude the energy flow in the reverse direction, i.e., into the utility power distribution network. In the past, large rotating electrical machinery (such as large factory motors, elevator motors and the like), have been operated to result, under some operating conditions or circumstances such as in a dynamic braking mode, in the flow of power in the reverse direction, i.e., into the utility power distribution network with consequent disturbing variation of utility line voltage. This has caused justifiable concern on the part of the utilities and other utility customers who are connected by the utility lines network to the offending machine. This aspect of operation of certain prior art rotating machinery led to legislation and legal protection in the form of various tariffs and other utility restrictions by which customers have been restricted in the use of electrical rotating machinery wherein there is presented the possibility of flow of electrical power into the utility distribution network.

SUMMARY OF THE INVENTION

An object of the invention is the provision of a new energy converting system for generating AC electrical energy for use in powering an electrical load in parallel with an AC utility service.

A further object of the invention is the provision of such an energy converting system for supplementing the AC power provided to such load by the utility service by acting cooperatively with the utility service power, and particularly such a system for providing supplemental AC power to household electrical loads or other similarly-sized loads for domestic or commercial purposes.

A further object of the invention is the provision of such an energy converting system which is useful for home owners, industrial and other commercial users, in remote or mobile locations where only limited AC power is available, which can be utilized in locations where extremes of temperatures, whether cold or warm, are encountered; and which may be utilized in numerous locations for the purpose of taking advantage of the utility and economy of combustion of available hydrocarbon fuels.

A still further object of the invention is the provision of such a system which automatically provides supplemental power to such a load without requiring the disconnection of the utility service from the load and without requiring isolation of the system from the utility service.

A further object of the invention is the provision of such a system which provides supplemental AC power to the load in synchronism with the utility service AC power and at the same frequency and phase.

A related object of the invention is the provision of such a system incorporating a hydrocarbon fueled prime mover and AC motor-generator wherein the speed of the prime mover and the motor-generator correspond to the electrical demand of the load, rather than operating at a constant speed.

Another object of the invention is the provision of such a system which permits the utility service to supply additional power as may be required by the load in excess of the normal capacity of the new system.

Yet another object of the invention is the provision of such a system which is of a self-contained, relatively compact, pre-packaged character.

A further object of the invention is the provision of such a system which conduces to extremely facile, simple, and quick interconnection with existing wiring which is utilized in households for connection of household or similar loads in an AC utility service, whereby the system is readily and quickly placed in operation.

An especially notable object of the invention is the provision of such a system which converts hydrocarbon fuel energy to AC electrical energy in an extremely efficient manner.

A most significant further object of the invention is the provision of such an energy converting system which extracts an extremely high percentage of the energy provided by combustion of hydrocarbon fuel, an implicity related object being the provision of such a system which recovers the substantial portion of heat produced from such combustion and which supplies such heat for manifestly useful purposes, such as for household heating, rather than wasting the same.

A most remarkable object of the invention is the provision of such an energy conversion system which, in widespread usage, can conserve and avoid needless wastage of precious hydrocarbon fuels, in contradistinction with present practices for converting hydrocarbon fuels to electrical energy, by converting energy released by combustion of low-valued hydrocarbon fuel into highly-valued electrical energy.

Among still further objects of the invention may be noted the provision of such a system which is capable of providing all such users reduced expenditures for energy, giving flexibility in selecting the form of energy one desires to use, allowing flexibility in selecting users for such energy, and which provides the capability of transporting the energy available from the hydrocarbon fuels over great distances with extremely high efficiency.

A still further object of the invention is the provision of such a system which allows the user thereof to select its operation to result in the obtaining of from approximately two to approximately five times more valuable total energy for a given energy cost than could be obtained by purchasing such energy which otherwise is distributed by available energy utility services.

An important further object of the invention is the provision of such a system which utilizes extremely compact, efficient and lightweight electrical generating apparatus which aspect conduces to small size, low initial costs, and low operating costs for the system.

A further object of the invention is the provision of such a system which is self-starting upon electrical power demand of the household or similar electrical load interconnected with the system exceeding a predetermined threshold.

A related further object of the invention is the provision of such a system which is selectively controllable to permit self-starting initiating of operation only when the electrical load demand is sufficient to permit economical use of the system and which operates only for so long as continued operation is economically justified, being entirely automatic in operation to obviate supervision, monitoring, adjustment, etc.

Important technical objects of the invention include the provision of such a system which operates not only in synchronism with utility service power and at the same frequency and phase, but also which prevents flow of power generated by the system from flowing from the system to the utility service; the provision of such a system which has extremely short response time for properly and promptly responding to changes in the level of AC power demanded by household or other loads supplied with power by the system; and the provision of such a system which is most precise and stable in operation.

Another object of the invention is the provision of such a system which is quiet in operating and which does not transmit objectionable vibrations to surrounding structure.

Other objects of the invention will be in part apparent and in part pointed out hereinbelow.

DESCRIPTION OF THE PREFERRED EMBODIMENT

Figure 1:
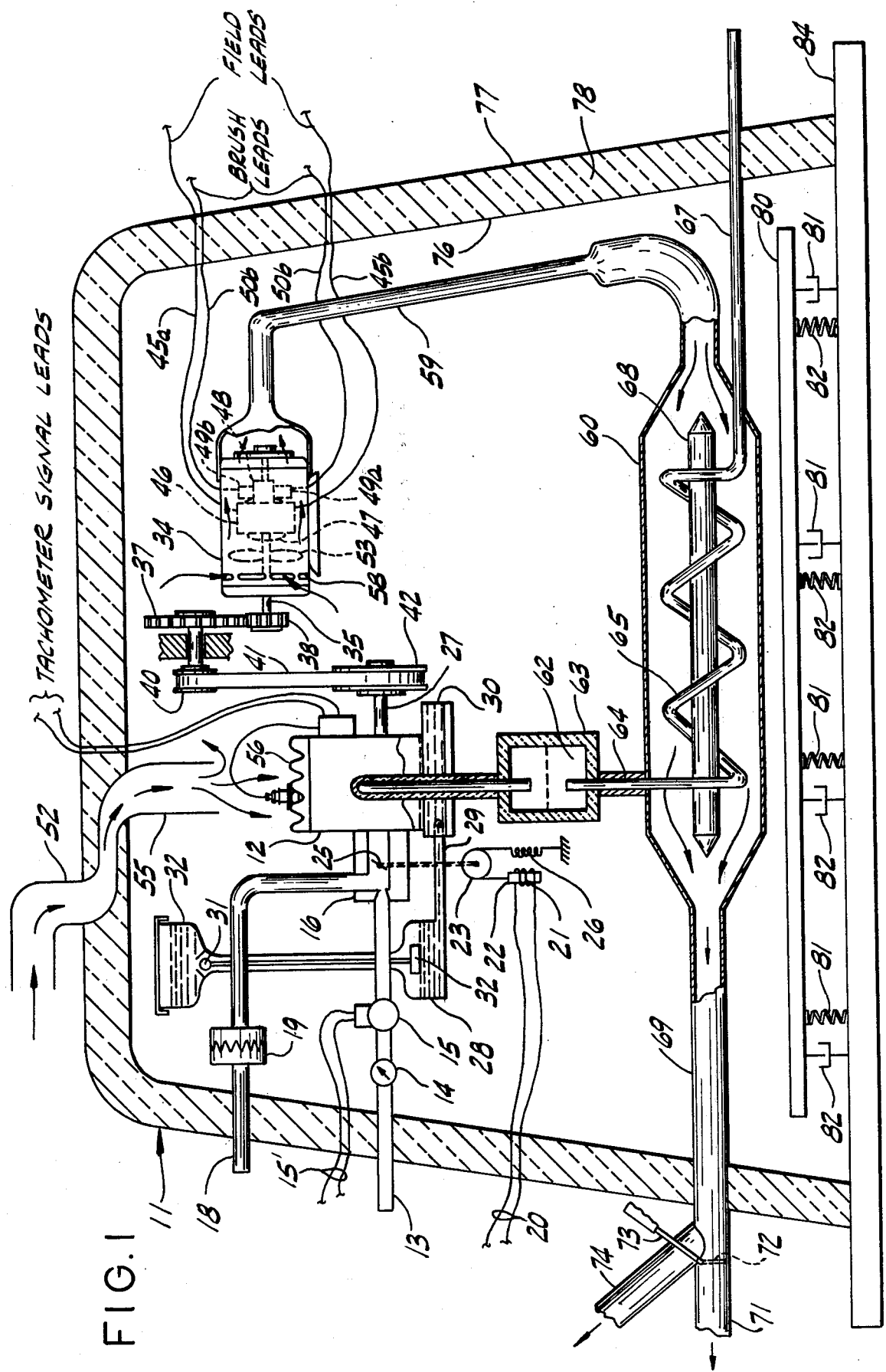
FIG. 1 is a pictorial simplified illustration of a household supplemental electrical power generating system constructed in accordance with and embodying the present invention, said illustration being in the nature of a cross-section through an enclosure for the system.
Figure 3:
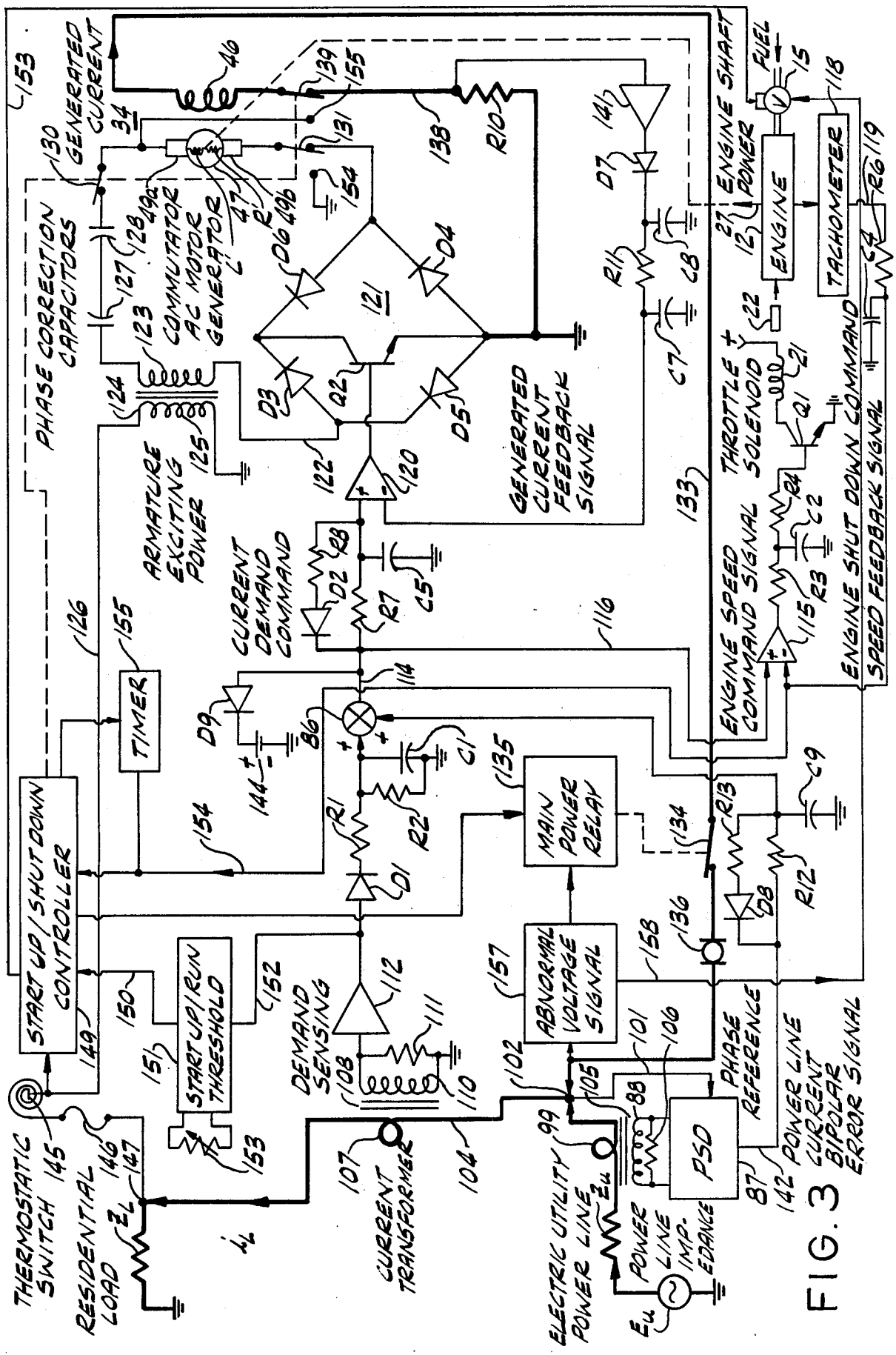
FIG. 3 is a more detailed schematic diagram of the circuitry of the invention.

Referring now to FIG. 1, the mechanical aspects of the new household supplemental electrical power generating system are illustrated. FIG. 1 shows only a simplified physical arrangement of mechanical elements of the invention within an enclosure 11. However, the system includes relatively more compact electronic circuitry including various sensors and controls, as shown in FIG. 3, which may also be contained within enclosure 11. Therefore, it should be observed that enclosure 11 may also house certain elements of such circuitry except those which are necessarily located outside the enclosure for interconnection or use in association with pre-existing electrical wiring interconnecting a AC utility service with household or similar electric load, for which the new system is intended to provide supplemental AC power.

Referring now to FIG. 1, enclosure 11 contains an internal combustion engine 12 which may be of standard 2-cycle or 4-cycle design. Engine 12 is of the spark ignition type and may have a horsepower rating within the range of about 1.75 horsepower up to several horsepower. Such power ratings are merely illustrative and are not intended in any way to limit the scope of the invention, being merely representative of horsepower ratings useful for supplying conventional electrical loads of households.

Engine 12 is of conventional design, being modified only to the extent necessary for operation of the same from a source of gaseous fuel, such as natural gas or LP gas. Such fuel is supplied by tubing connection 13 which connects the apparatus with a gas meter or tanks or the like of the fuel. Gas delivered by conduit 13 is delivered through a gas pressure regulator 14 and through a solenoid actuated fuel valve 15 to a carburetor 16 of the engine. Control circuitry described below controls operation of valve 15 by means of leads 15'.

Air is supplied from outside of enclosure 11 to carburetor 16 by means of an air inlet 18 and through an air filter 19 of conventional design for removing airborne dust and dirt particles to preclude ingestion of the same by engine 12.

The engine is of the type adapted to operate during normal operation over a substantial speed range such as from several hundred RPM to several thousand RPM and a concomitant substantial power range such as from 0.1 horsepower to 1.75 horsepower. For this purpose, an electrical throttle control signal constituting an engine speed command proportional to desired engine speed (and power) is provided by a pair of leads 20 for energizing a throttle control solenoid 21 having a solenoid plunger 22 which is interconnected by an appropriate mechanical linkage 23 to control the positioning of a throttle butterfly valve 25 of carburetor 16. The butterfly valve is biased toward its closed position by a spring 26 in opposition to the throttling force provided by solenoid 21. Thus, the throttle setting actually achieved is proportional to the strength of the throttle control signal thereby controlling the speed of rotation of a drive shaft 27 and power output of the engine.

In order to ensure safe operation through proper lubrication of the engine over long periods of time, an engine oil auxiliary reservoir 28 is interconnected by a conduit 29 with the crankcase 30 which normally contains a supply of oil for the engine. Auxiliary reservoir 28 is automatically maintained full over long periods of engine operation, as engine oil is used up, by an oil valve 31 which is opened when an oil float 32 drops as the engine oil in reservoir 28 falls. A reserve oil reservoir 32 contains a relatively large supply of engine lubricating oil to replenish that eventually consumed from auxiliary reservoir 28.

At 34 is indicated a motor-generator which serves the functions of starting engine 12 and also generating AC power after operation of engine 12 is automatically initiated in a manner described hereinbelow. For the purpose of multiplying the torque supplied by motor-generator 34 for starting of engine 12 and also for multiplying the angular velocity of a drive shaft 35 of the motor-generator during normal operation of engine 12, there is provided a gear train comprising a large diameter gear 37 and smaller diameter gear 38 carried on the shaft 35 of motor-generator 34. Gear 37 is driven by a sheave 40 of relatively small diameter which is in turn driven by a belt 41 passing around a larger diameter sheave 42 carried upon motor drive shaft 27.

Motor-generator 34 is a commutator type device which is externally excited. When excited by AC exciter current provided to the rotor, leads 45a,45b of the field, or stator, winding 46 of the motor-generator provide generated AC power. The armature of rotor 47 of the motor-generator has a commutator 48 which is contacted by a pair of brushes 49a,49b with which are shown connected a pair of leads 50a,50b for energizing the rotor winding. Both the stator and rotor have laminated cores, in contrast with DC generators which typically do not employ laminated cores.

The field leads 45a,45b are armature leads 50a,50b are connected in a manner described hereinbelow for providing the starting and generating functions of the motor-generator.

It may be here emphasized that the armature 47 of the motor-generator is adapted to operate at speeds which are extremely high in comparison to those commonly used with normal synchronous AC generators. Such angular velocities may be, for example, as high as very approximately 20,000 RPM in normal operation of the device. The motor-generator is preferably rated to provide considerable power up to several kilowatts but more preferably about one kilowatt.

By the illustration of the apparatus of the invention with a single motor-generator, it is not intended to limit the scope of the invention, it being understood that the system will in any event include at least one motor-generator of the present type.

Unheated air is drawn into enclosure 11 through a sound-deadening labyrinth 52 by the action of a blower fan 53 of the motor-generator. A suitable nozzle 55 associated with the labyrinth 52 directs the air appropriately for cooling of engine 12 whereby heat is extracted from the engine by heat transfer from its usual cooling fins 56. The now partly warmed air is drawn into apertures 58 of the housing of motor-generator 34 by fan 53 for cooling of the motor-generator. The air is thus further warmed by the heat produced by operation of motor-generator 34. This is then ducted through a conduit 59 into a heat exchanger 60 of the counterflow type. A counterflow heat exchanger is preferred for the purpose of achieving the most efficient extraction of heat from the hot engine exhaust produced by internal combustion engine 12. The engine exhaust gases are passed through a conventional muffler 62 which, together with exhaust conduit 64, is surrounded by thermal insulating material 63 for preventing premature cooling of the exhaust gasses. The thermal insulation 63 around muffle 62 and exhaust conduit 64 also minimizes undesired heating within the control circuitry of the invention which could be damaged by excessive heating and also precludes heating of the air entering motor-generator 34. The smoothed flow of hot exhaust gasses is delivered by a conduit 64 to a plurality of turns of conduit constituting a heat exchanger coil 65 within the heat exchanger. A discharge conduit 67 emerges from the heat exchanger and passes through and outside the walls of enclosure 11 for discharging of the now cooled exhaust gasses to the atmosphere exteriorally of the enclosure 11. A diffuser cone 68 diverts air flowing through duct 59 smoothly in and around heat exchanger coil 65 to provide undisturbed, nonturbulent and quiet air flow out of the heat exchanger and into a hot air delivery conduit 69.

The heated air passing through conduit 69 is ducted outside of enclosure 11 where a heated air delivery conduit 71 is utilizable for directing the heated air into the residential area of the household by utilizing the pre-existing residential air ducts, or directly into living quarter. Accordingly, the heat recovered from operation of the system may effectively and efficiently be utilized for household heating purposes thereby conserving energy which otherwise would be irretrievably lost. Associated with hot air delivery conduit 71 is a valve member 72 adapted to be selectively positioned by operation of a handle 73 or other equivalent operating means whereby the heated air may, if desired, be directed into a hot air discharge conduit 74 for simply discharging or "dumping" the heated air into the atmosphere. This may be done in circumstances wherein the heated air is not desired, but low cost electric power is desired, within the residence, as when the temperature therein is sufficiently warm, as during hot summer. Valve operating means 73 may be automatically positioned, if desired, under the control of a thermostat in a conventional manner whereby the temperature within the residence or other area receiving the air provided by conduit 71 may be automatically regulated.

Although, as previously stated, enclosure 11 is merely schematic, rather than being intended to represent a specific mechanical construction which is well within the purview of the skilled artisan, it should be observed that the enclosure is in any event provided with inner and outer walls 76, 77, respectively. Thermal insulation material 78 is provided between the walls which also have sound deafening properties. Thus, the thermal insulation material 78 not only prevents undesired flow of heat to the region outside of enclosure 11 but also prevents sonic noise emitted by the operation of engine 12 and motor-generator 34 from undesirably being transmitted from enclosure 11. Thus, enclosure 11 largely confines the engine and motor-generator noise during normal operation.

Additionally, it may be observed than an inner base plate 80 is provided upon which the various mechanical elements, such as engine, motor-generator 34, and heat exchanger 60 are appropriately mounted by conventional support structure, which is not shown in the interest of simplifying the drawings. In this regard, it may also be noted that positioning of the various mechanical elements is merely pictorial and graphic rather than representing the detailed actual physical layout, such mounting details being mere matters of design choice. Base plate 80 is supported by resilient means 81 which have shock absorbing devices 82 of conventional type associated therewith to provide damped, spring-like acoustic noise isolation between the inner base plate 80 and an outer base plate 84 of the apparatus. Such isolation serves also to suppress transmission of objectionable operational vibrations to the outside environment where persons may desire quietude and freedom from disturbance. Accordingly, the system may be mounted by outer base plate 84 on a floor of a dwelling or residential area but without the floor having induced into it objectionable vibrations or acoustic noises during operation of the system.

Figure 2:
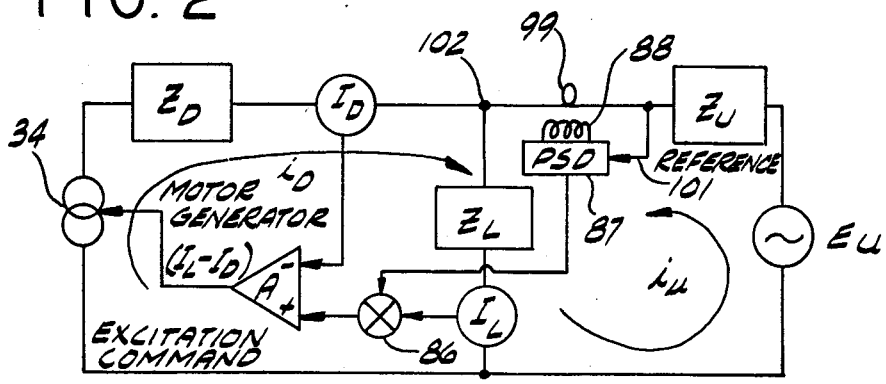
FIG. 2 is a simplified circuit schematic diagram of circuitry of the new system illustrating the general principles of its operation.

Referring now to FIG. 2, the principles of operation of the new system are revealed and may be considered preliminarily before discussing the specific circuitry of the invention. Fundamentally, motor-generator 34, as utilized in its electrical power generating mode, functions as a controlled current generator, the generator voltage being substantially constant at nominally 120 volts RMS. Therefore, it is to be understood that the generated voltage follows variations in the utility line voltage and the generated current follows the residential load demand. Total load current drawn by various electrical loads within a household or other location utilizing the new system is measured. The measured value is used as a positive command to proportionately control AC excitation of the armature winding of motor-generator 34. AC excitation power is derived from household lines, whereas the excitation command controls the excitation magnitude. The field winding thereof then supplies AC electrical current and power in synchronism with the AC power provided by conventional utility services for at least supplementing parts of the electrical power demand of the household or other domestic load. Current generated by motor-generator 34 is also measured to achieve operation of motor-generator as a controlled current source. This measured value is subtracted from the previously mentioned positive command to reduce the net magnitude of excitation of the armature proportionately as the current generated by the motor-generator rises toward, but neither exceeds nor typically quite attains, magnitude equalling the total electrical power demand of the various electrical loads served by the system. Hence, by the terms "supplementing" or "supplemental" in this application is meant that the system may provide at least a part of the electrical power demand of such load but is not to preclude operation in which the system approaches the provision of substantially all of the power demanded by the load.

FIG. 2 represents in schematic form a simplified circuit of the system as configured for carrying out these concepts. In FIG. 2, $E_U$ is used to designate the voltage of the utility voltage source and $Z_U$ is used to designate the source impedance of the electrical utility lines. The net impedance of the various electrical loads within the household or other installation wherein the new system is installed is represented by $Z_L$. The symbol $Z_D$ is utilized to represent the source impedance of motor-generator 34 as operated in its generating mode. The symbol $I_L$ represents a current metering means (and its output signal) which measures current flowing through the electrical loads represented by impedance $Z_L$. The symbol $I_D$ represents a current metering means (as well as its output signal) which measures the magnitude of the current generated by motor-generator 34.

The simplified circuit of FIG. 2 is thus seen to be constituted by two primary meshes having respective mesh currents $i_U$, representing the current supplied by the utility supply voltage source $E_U$, and $i_D$, representing the current generated by motor-generator 34.

The symbol A is utilized to designate a differential current amplifier for providing an excitation command to motor-generator 34. Differential current amplifier A receives at its inverting input a signal corresponding to the magnitude of the current measured by current metering means $I_D$. It also receives at its noninverting input a signal provided by a signal summer 86 which receives the signal from current metering means $I_L$ which represents the magnitude of the current $(i_U + i_D)$ flowing through the load impedance $Z_L$.

Summer 86 also receives a signal, either positive or negative, which is provided by a phase sensitive detector (PSD) 87 having a winding 88 inductively coupled to a winding 99 through which the utility current $i_U$ passes and receiving a voltage phase reference by means of a connection 101 with the utility supply mesh at a point in the power distribution means, i.e., the household wiring which provides the utility power to the household loads. This output signal of PSD 87 has a magnitude which is a function of the magnitude and direction of the flow of current $i_U$ through winding 99 relative to the phase of the voltage phase reference, provided by connection 101. A node 102 represents the point of interconnection of apparatus of the new system with the household (or other installation) wiring. Accordingly, it will be understood that, so long as the motor-generator 34 of the new system is not operated in a manner causing any component of $i_D$ to flow in the mesh containing utility voltage source $E_U$ (i.e., in effect causing the current to be delivered to, rather than from, the utility), then the output of PSD 87 is zero if and only if $i_U$ is zero. The output of PSD 87 is proportionately positive if part of the total current through $Z_L$ is supplied by current $i_U$. That is, during positive half-cycles of voltage reference 101, the output of PSD 87 is proportionately positive if utility line current $i_U$ flows in the positive direction indicated by the arrow associated with $i_U$. Conversely, if during positive half-cycles of voltage reference 101, the output of PSD 87 is proportionately negative if utility line current $i_U$ flows in the negative direction.

Current flowing through impedance $Z_L$ generates a positive command into the noninverting input of differential current amplifier A. This positive command results in the provision of an excitation command by differential current amplifier A which is supplied to the excitation power circuit which supplies AC power to the armature winding of motor-generator 34 for causing the latter to generate current of magnitude $i_D$. Such current is measured by current meter $I_D$ and this measurement produces a negative command which is supplied to the inverting input of differential current amplifier A. It is easily seen that as the output signal of current meter $I_D$ increases with increasing magnitude, approaching the magnitude of current meter $I_L$ in magnitude, the net output of differential current amplifier A, which is proportional to the quantity $(I_L - I_D)$, approaches zero. In other words, negative current feedback via $I_D$ causes motor generator 34 to generate current $i_D$ in response to command from $I_L$.

As a result of these concepts, the motor-generator excitation command, which is proportional to the magnitude of the quantity $(I_L - I_D)$, becomes larger as more current flows through impedance $Z_L$ and becomes smaller as the motor-generator supplies more current through impedance $Z_D$. On the other hand, if because of errors in the control circuitry for one reason or another, or for other reasons more fully developed hereinbelow, the voltage provided by the system at node 102 should rise such that current incipiently would flow toward rather than from the utility supply voltage $E_U$ (i.e., current $i_U$ should become negative) then PSD 87 will provide a negative signal causing the excitation command to be decreased appropriately, whereby mesh current $i_U$ is forced toward zero and may become slightly positive.

Manifestly, the system operates to essentially provide most, if not quite all, of the current and power requirements of impedance $Z_L$ up to the rated limit of power output of motor-generator 34. As this limit is reached, further excitation command is unavailing and the additional power demand is supplied by utility source $E_U$.

Referring now to FIG. 3, specially preferred circuitry of the invention is shown interconnected with an electric utility power line having a voltage source $E_U$ which provides normal household voltage, i.e., 110–120 VAC, as to lights, heating devices, heat pumps, and various appliances typical of a residential installation and having an effective impedance $Z_L$ which may be assumed to be substantially resistive. The power line impedance $Z_U$ is typically quite small, being on the order of milliohms. The existing house wiring constituting the power distribution means which normally provides the utility power to the residential load $Z_L$ is designated 104 and such is neither disconnected nor disturbed in utilization of the new invention.

Node 102 represents the point of interconnection of the system with the existing house wiring 104 and may, for example, be represented by the point at which the electric power utility lines enter the residence or other location wherein the new system is to be utilized, and are connected within a junction box containing the various fuses or circuit breakers typically associated with residential wiring.

At a point prior to (on the utility side of the junction box) connection with node 102, the electric power utility line has associated with it a transformer 105 having a one-turn primary winding 99 as noted. Inductively coupled to winding 99 is a 1,000-turn secondary winding 88 having a current shunt 106 thereacross whereby there is provided an AC signal of typically 100 millivolts RMS per ampere of current flowing from the utility power line into node 102 for dissipation by the residential electrical load $Z_L$. The low AC voltage appearing at the secondary of transformer 88 is directly proportional to the magnitude of the component of load current flowing from the utility power line into node 102. Such current flows also through a one-turn primary winding 107 of a further current transformer 108 having a secondary winding 110 including a shunt 111 thereacross, again to provide an AC output voltage at the secondary winding 110 of typically 100 millivolts RMS per ampere of current flowing through an AC amplifier 112 and is then rectified by a diode D1 and provided through a resistor R1 to a ripple filter comprising resistor R1, a capacitor C1, and in shunt with C1 is a resistor R2 for the purpose of relatively quickly bleeding off the charge on capacitor C1. Such quick response time is desirable to respond quickly to a reduction of the current load demanded by load $Z_L$, realizing that such demand may suddenly subside when a relatively large current-dissipating load (such as a low impedance resistive heating element) is switched off within the residence or other location utilizing the new system.

The magnitude of the filtered DC voltage appearing across capacitor C1 is provided as an intput to signal summer 86 which may be constituted by a conventional integrated circuit operational amplifier which is known to be utilizable for the purpose of summing signals algebraically. Summer 86 provides a signal output on a lead 114 constituting a current demand serving two functions: (1) as an engine speed command signal (2) as an excitation command for controlling the degree of excitation of the armature 46 of motor-generator 34.

The current demand command signal appearing on lead 114 is provided to the noninverting input of a differential amplifier 115 via a lead 116 interconnected with signal summer 86. Differential amplifier 115 amplifies this signal to provide an output signal which is provided through a low-pass filter including resistor R3 and capacitor C2. The voltage across capacitor C2 causes a proportional current to flow through resistor R4 into the base of an NPN transistor Q1 which in turn proportionally controls current through the collector-emitter circuit which is interconnected with throttle control solenoid 21, one end of which receives a DC potential of a level suitable for operation of semiconductor circuitry. Such is preferably provided by a conventional regulated low voltage power supply (not shown) which may be utilized for providing also voltages to the various other solid state circuits of the system in an entirely conventional and well-known fashion.

Accordingly, as the DC output of signal summer 86 provided via lead 116 increases or decreases, the DC current flowing through throttle control solenoid 21 will be respectively more or less. A movable plunger 22 of such solenoid, through mechanical interconnection, as previously described with the throttle of engine 12, causes the engine speed and shaft power capability to correspondingly increase or decrease as the DC output of the summer 86 increases or decreases, respectively. The drive shaft 27 of engine 12 is interconnected in the manner previously described for driving the armature 47 of the motor-generator 34 at an angular velocity correspondingly greater than that of the engine. Interconnected with engine 27, as by means of interconnection with its ignition circuit or other convenient point whereby engine speed may be measured, is a tachometer 118 of either commercially available (National Semiconductor LM-2917) or known circuit type for providing an output signal via a lead 119 which is proportional to the angular velocity of engine drive shaft 27. This output signal is provided through a low-pass filter, including a resistor R6 and capacitor C4 to provide a speed feedback signal to the inverting input of differential amplifier 115. Accordingly, there is provided a speed control regulation control loop of a closed type which ensures that the actual engine speed accurately responds to the engine speed command signal for causing the speed of the engine to be sufficient for generating the amount of AC power commanded of motor-generator 34 by the current demand command signal provided by the output of signal summer 86.

As previously noted, the output of signal summer 86 also functions as a current generation command signal. For this purpose, a nonlinear low-pass filter is interconnected with output lead 114 of the signal summer. This low-pass filter comprises resistors R7 and R8, a capacitor C5 and a diode D2 connected in series with resistor R8 across resistor R7. Therefore, the filtering action of this low-pass filter is such as to provide a lag or delay in the positive-going current generation command provided thereto for permitting engine speed to increase and stabilize before heavier generator counter-torque, which would result from an increase in current being generated thereby in response to a current demand command, is applied to engine drive shaft 27. For this purpose, the time constant provided by resistor R7 and capacitor C5 is much greater than that provided by resistor R3 and capacitor C2 which are interconnected with the base of transistor Q1. Hence, this nonlinear low-pass filter provides a current demand command signal to the noninverting input of a differential amplifier 120 which rises much more slowly than does the engine speed signal at the base of transistor Q1. However, the resistance of resistor R8 is much less than the resistance of resistor R7. Therefore, when the output of signal summer 86 decreases abruptly, as when a part of the residential load $Z_L$ is eliminated, e.g., by being switched off, or in the event of certain control functions which may be realized in a manner hereinafter described, it will be apparent that capacitor C5 is permitted to quickly discharge through diode D2 and resistor R8. In this way, the magnitude of the current demand command decreases abruptly in close compliance with any abrupt decrease in the residential electrical load current $i_L$ measured by current transformer 108.

The current demand command which is supplied to the noninverting input of differential amplifier 120 is amplified, causing current to be supplied to the base of an NPN transistor Q2 whereby the conductance of transistor Q2 through its collector-emitter circuit is controlled proportionately. In this sense, transistor Q2 functions as a controlled conductance. The conductance of transistor Q2 increases as the output of differential amplifier 120 increases. The collector-emitter circuit of transistor Q2 is connected across nodes of a full-wave diode rectifier bridge 121 having diodes D3, D4, D5 and D6. By this arrangement, the controlled conductance function of transistor Q2 is available for bipolar operation, that is, to control the series resistance in an AC circuit.

This configuration of full-wave bridge 121 and transistor Q2 connected thereacross causes transistor Q2 to be effectively connected in series by means of a lead 122 with the secondary winding 123 of a transformer 124, the primary winding 125 having one end connected to be supplied with AC power by means of a lead 126 in a manner described hereinbelow whereby AC power is made available to the primary winding and is coupled inductively into the secondary winding for AC excitation purposes.

Also connected in series with secondary winding 123 are a pair of capacitors 127, 128, a set of relay contacts 130 (which are described below but which may be for the present assumed to be normally closed for generation of power by motor-generator 34) and the winding armature 47 which has an intrinsic inductance L' and resistance R'. For this purpose, the armature has a commutator interconnected with its winding and contacted by brushes 49a, 49b. The series circuit having the aforementioned components continues through another set of relay contacts 131 (which also are normally closed for power generating purposes) and the circuit connection is completed at bridge 121 at the node between diodes D4 and D6.

Consequently, AC current produced by secondary winding 123 flows through diode D6, transistor Q2, and diode D5 and through generator armature 47 (i.e., through its winding) during the positive half cycle of voltage induced in secondary winding 123; and then flows through diode D3, transistor Q2 and diode D4 and the generator armature 47 during the negative half cycle of voltage induced in transformer secondary winding 123. In this manner, unipolar DC current flows through transistor Q2 although bipolar AC current flows through the generator armature. The controlled conductance of transistor Q2 thereby controls the magnitude of the AC current flowing through the generator armature for exciting purposes.

The phase correcting capacitors 127, 128 tune out the inductive reactance of the generator armature circuit to ensure that the phase of the AC current flowing through the armature is nearly if not completely identical with the phase of the AC line voltage impressed upon the transformer primary winding 125.

The AC voltage appearing across the field (stator) 46 of motor-generator 34 is nearly if not identically in phase with the current flowing through the armature. The magnitude of this field voltage is controlled by the conductance of transistor Q2 and the angular velocity of the armature which is, as pointed out previously, controlled by the engine speed command signal which results in operation of engine 12 at an appropriate speed for generating the power demanded by the residential load $Z_L$.

The current which flows from the generator field 46 is provided by a heavy duty lead 133 which passes through a set of contacts 134 of a main power relay 135, the operation of which is described later but which may be assumed, for present purposes, to be energized for closing of contacts 134. The current also flows through a circuit breaker 136 whereby the generated current is supplied to node 102 for delivery by conductor 104 to the household load $Z_L$.

The magnitude of the current flowing into node 102 is, of course, dependent upon the field voltage and the parallel combination of the residential electrical load $Z_L$ and power line impedance $Z_U$ as well as the phase relationship between the utility source voltage $E_U$ and that of the field voltage. It has been established that the field voltage is in phase with the utility source voltage, this being ensured by transformer 124 which provides AC excitation of the motor-generator 34 in phase with the AC power provided by the utility, and the pair of capacitors 127 and 128 which cause the load on transformer secondary 123 to be essentially resistive and nonreactive because the armature 47 inductance L' is tuned out.

If the magnitude of the nearly sinusoidal field 46 voltage were identical to that of utility voltage $E_U$ and the phase of the field voltage were identical with the utility voltage $E_U$, no generated current would flow. By properly setting the gain of AC amplifier 112 and DC differential amplifier 120 and by proportionately controlling the speed of engine 12 in the manner previously described, the field current can be made to increase and decrease in proportion to the current demanded by the residential load $Z_L$ up to the maximum capability of the present apparatus. However, the voltage output of the field 46 would experience a large increase due to the combined effects of increased excitation and increased engine speed resulting from an increase of the demand command signal on lead 114, and excessive current would flow in the field 46 if only resistor R10 limited the field current.

A current feedback signal representative of the magnitude of the current generated in winding 46 is obtained by sampling the actual field current through a small value resistance R10 connected in a lead 138 which connects one side of the field to the circuit ground through a set of relay contacts 139, and by amplifying the voltage induced across resistor R10 by an AC amplifier 141, the output of which is rectified by a diode D7 and smoothed by a circuit comprising a resistor R11 and capacitors C7, C8. This DC feedback signal is supplied to the inverting input of differential amplifier 120 to cause the field current to precisely respond to the current demand command provided by summer 86. In this manner, even large variations or errors in engine speed or variations of the voltage at transformer secondary winding 123, or other errors or imperfections arising in the armature and field circuits are effectively nullified to prevent their effect upon the commanded magnitude of the current produced in field winding 46.

In order that the current generated at field 46 shall faithfully and controllably follow the demand command signal on lead 114, and the field voltage shall remain well controlled at nominally 120 VAC in spite of large variations in engine speed, a current control regulation loop is utilized. The result of the current control regulation loop is to desensitize the field voltage from the effect of variable engine speed, and cause field current to achieve the commanded value even though engine speed is fast or slow or quite in error from the commanded value desired for production of required shaft torque.

The employment of two feedback loops for controlling respectively the motor speed and generated field current results in the generation of current by motor-generator 34 which almost identically matches the actual power demanded by the residential electrical loads, as represented by impedance $Z_L$. However, residual control errors, whether due to variations in value of the armature angular velocity, temperature extremes, aging of components, erratic operation or wear or age of the engine, or drift in the characteristics of various components such as transformer 108 or AC amplifier 112, or for whatever reason could, indeed result in some small and perhaps insignificant but nevertheless undesirable electrical power flow either into the electric utility power line, or else could result in the failure of the new system to supply most if not essentially all of the entire electrical power demand of the residential electrical load.

To guard against this possibility and as an additional aspect of the operation constituting a refinement for the purpose of achieving more perfect operation, bipolar phase sensitive detector (PSD) circuit (sometimes referred to in the art as a phase demodulator circuit) 87 is utilized to determine whether or not net power flows from, rather than into, the electrical utility power line, which remains at all times connected to node 102.

PSD circuit 87 may be constituted by an integrated circuit type of device such as that commercially available from National Semiconductor as LM-1496 balanced demodulator and adapted to provide an output signal which is equal to $kVI\sin(\theta-\phi)$ where k is a gain constant, V is the clipped constant magnitude of the voltage reference input 101 after it is phase advanced by a constant 90 electrical degrees in circuit 87, and I is the peak magnitude of the current measured by means of winding 88 inductively coupled to the single-turn winding 99 in the electric utility power line, $\phi$ is the phase of lead 101 voltage reference after it is advanced 90 degrees, and where the quantity $(\theta-\phi)$ represents the difference between the phase angles of the phase advanced voltage at node 102 and the phase of current flowing through single turn winding 99. This output signal is provided by means of a lead 142. The utilization of PSD circuit 87 is such that "in phase" utility line current, that is, line current in phase with the utility voltage, causes the PSD output to be positive in magnitude and proportional to I, and also utility line current 180 electrical degrees out of phase with line voltage (signifying that current is delivered into the utility line) causes the PSD output to be negative in magnitude and proportional to I flowing into the utility. Since the current either flows from the utility power line into node 102 or flows from node 102 toward the utility voltage source $E_U$, or is zero, the output on lead 142 is either proportionately positive, negative, or zero valued, respectively. Hence, such signal may be referred to as a power line current bipolar signal. This bipolar error signal is proportionately positive if the utility is supplying power to the load and is proportionately negative if power is, for one reason or another, being permitted to flow from node 102 into the utility power lines. If no net power flows from the utility into the residential load, as is desirably the case, the bipolar error signal is zero.

Assuming then that the system is operating such that the utility line current is not zero valued, the bipolar error signal on output lead 142 is utilized for correcing any imperfection and returning operation of the system to a substantially ideal state, wherein the bipolar error signal is not negative but rather is preferably slightly positive in order that the home owner avoid the supplying of electric power into the utility power lines. For this purpose, the bipolar error signal is low-pass filtered by a nonlinear filter comprising a resistor R12 having connected thereacross in series a resistor R13 and diode D8, such filter including a capacitor C9. The filtered bipolar error signal is provided to summer 86 for the purpose of adding to the current command of lead 114 or subtracting from the current command at lead 114.

This operational aspect may be examined more closely. If the bipolar error signal is negative, i.e., if the output of PSD 87 goes negative, signifying that some generated electric current is flowing from node 102 into the utility power line toward source $E_U$, diode D8 conducts, rapidly discharging capacitor C9 through resistor R13, which has a lower value than that of resistor R12. Hence, a negative power line bipolar current error signal is provided as an input to signal summer 86. The signal gain of PSD 87 is preferably set comparatively higher than AC amplifier 112 commensurate with achieving a high degree of control loop stability and so that any utility power line current flow error sensed by PSD 87 is weighted more heavily than regular current demand signals produced by secondary winding 110 of the demand sensing current transformer 108.

Of course, the apparatus of the new system may be of such size and power generating capacity that occasionally residential electrical load current may exceed the machine rated capability. Such is desirable for the purpose of economy as it may not be economically desirable to provide the new system with a power generating capability equivalent to the extreme peak demand of typical residential loads, which on a national twenty-four hours basis throughout the year, may average only about one-half kilowatt. An idealized nominal size for apparatus of the new system is preferably slightly more than one kilowatt.

To preclude engine 12 from being given an overspeed command and also to preclude any attempted overload of motor-generator 34, a clamping diode D9 is biased by means of a battery or other voltage source 144 and has its anode connected to the output 114 of signal summer 86. Depending upon the magnitude of the potential established by battery or voltage source 144, the output of signal summer 86 is limited in maximum positive vlaue to limit the engine speed command signal and also the current demand command accordingly.

It is to be observed that PSD circuit 87 and the non-linear filter interconnecting its output with signal summer 86, for the purpose of limiting the magnitude of signals provided to the noninverting input of differential amplifier 120, provide in effect a closed power line current nulling loop to substantially preclude the flow of electrical power generated by the present apparatus toward the utility power line source $E_U$ and thereby prevent unintended or undesirable flow of electrical power into the utility lines.

Operation of the new system for the purposes of generating power at least supplementally, if not almost entirely, for the household or residential electrical loads (which otherwise would be provided solely with power by the electric utility power line) is thus seen to be accurate and responsive.

Initiation and termination of power generating operation of the apparatur may not be considered. At the outset, it is important to observe that operation of the new system is not desirable if the residential electrical loads are insubstantial, amounting to only small power consumption, e.g., less than 0.1 kilowatt. Furthermore, since heat generated by operation of the system which otherwise would be wasted is preferably utilized for household or other heating purposes, it may not be economical to permit operation of the system where heat cannot be effectively utilized. For this purpose, a thermostatic switch 145 is interconnected by means of a fuse 146 with a node 147 representing a receptacle or other point of power connection within theresidence or other location in which the system is to be utilized. Thermostatic switch 145 may be adjusted by the householder for precluding operation of the system unless the temperature therein drops below a predetermined set point of the thermostat.

If, for example, electric power is commercially available at low cost and hydrocarbon fuel is relatively expensive, the set point of thermostat switch 145 may be set low whereby operation is precluded unless temperatures drop below a point at which economic savings of generating supplemental power and of deriving additional heat through operation of the system exceed the cost of supplying electric power and home heating fuel by purchase of the same from a commercial utility. On the other hand, the set point of thermostatic switch 145 may be quite high to enable electric power generation on hot summer days even though valve 72 may be set to dump all heat to the atmosphere if the cost of electric power is quite high and hydrocarbon fuel is guite low. Under these circumstances, operation would then be assured under most, if not all, temperatures expected to be encountered.

When closed, thermostatic switch 145 is adapted to provide the AC power available at node 147 to a start-up/shut-down controller 149 which may be simply a relay circuit or other semiconductor circuit of known conventional design adapted to provide a switching function for initiating operation of the system when power is provided by the thermostatic switch and a signal is delivered to an input lead 150.

A start-up/run threshold circuit 151 is adapted to provide such enabling signal to input 150. Circuit 151 is merely a level detecting circuit of known type adapted to provide a switching function for providing a signal to input 150 when an input signal provided by means of a lead 152 from the output of AC amplifier 112 reaches a predetermined magnitude. If this magnitude exceeds a preselected value determined by the setting of a potentiometer or other set point control 153 of circuit 151, a voltage is provided on lead 150 for permitting start-up/shut-down controller to initiate operation of the system. Threshold circuit 151 may be constituted by a conventional integrated circuit voltage comparator for providing an output signal when the input to the comparator exceeds a reference voltage controlled by the setting of potentiometer 153.

Controller 149 is adapted to control the previously noted relay contacts 130,131 and 139. For initiating operation, controller 149 causes relay contacts 130 to open and relay contacts 131 to switch to a position 154 providing connection of armature bush 49b to the circuit ground. Also, relay contacts 139 are caused to switch to a position 155 connecting the lower end of field winding 46 to the upper brush 49a of armature 47. When so connected, motor-generator 34 is adapted to function as a motor and current, therefore, may flow from node 102 via lead 133 and through both the field winding 46 and via lead 133 and through both the field winding 46 and armature 47, which are now in series, to the circuit ground for operating the motor-generator as a motor. Because of the ratio provided by the previously described arrangement of gears 37,38 and belt sheaves 40,42 (See FIG. 1), a speed reduction gearing is obtained during motor operation whereby the motor may effectively provide great torque for starting of engine 12.

Simultaneously with the operation of relay contacts 130, 131, and 139 for initiating starting operation, a signal is provided by means of a lead 153 for energizing fuel solenoid valve 15 to permit to flow to engine 12 for permitting operation thereof. It may also be observed that by virtue of a signal being present on lead 152, being the output of AC amplifier 112 signal summer 86 is provided with a potential of sufficient magnitude for creating an engine speed command signal applied to the noninverting input of differential amplifier 115. Therefore, throttle solenoid 21 is energized sufficiently for opening the throttle of engine 12 by an amount appropriate for starting.

Accordingly, engine 12 is turned over by torque provided by motor-generator 34 operating as a motor until the engine begins to run under its own power. When tachometer 118 provides an output signal via lead 119 indicative of operation of engine 12 of speed signifying that it is indeed running under its own power, such signal being provided by means of a lead 154 to the start- up controller 149, the latter is caused to switch relay contacts 130, 131, and 139 to the position shown in FIG. 3. Accordingly, motor-generator 34 is returned to its current generating mode and ceases to provide starting torque for engine 12.

Interconnected with controller 149 is a timer 155 of conventional multivibrator design adapted to permit starting operation of controller 149 in the manner just described for a predetermined interval such as a number of seconds sufficient for engine 12 to being running when cold starting is initiated. Timer 155 may preferably then be such as to disable operation of controller 149 after this predetermined interval and to preclude starting operation thereof for an additional period sufficient to prevent cooling of motor-generator 34 before reinitiating a starting attempt. Starting may, for example, be re-attempted once each minute.

It is also important to observe that the start-up/shutdown controller 149 provides a signal for energizing main power relay 135 when, after power is provided to the controller by thermostatic switch 145, a signal is delivered via lead 150 for initiating operation. Therefore, relay contacts 134 are closed upon initiating operating of the system and normally remains closed.

However, it is desirable to terminate operation of the system in the event that abnormal voltage should be sensed on node 102 as, for example, during electric utility malperformance. For this purpose, an abnormal voltage sensing circuit 157 (which may be simply a voltage comparator of conventional integrated circuit design) is interconnected with node 102 and also with main power relay 135. If the voltage on node 102 should exceed a certain threshold which is safe for operation (e.g., 125 VAC) or should, on the other hand, drop below a value for which operation of the system should be terminated (e.g., 105 VAC), voltage sensing circuit 157 causes main power relay 135 to open relay contacts 134 whereupon power ceases to be generated by motor-generator 34. Also, a signal is provided in the event of such abnormal voltages by means of a lead 158 to fuel solenoid valve 15 for shutting off the flow of fuel to engine 12.

Normally, however, operation of the system remains in effect for so long as the magnitude of the signal provided by means of lead 152 to threshold circuit 151 remains adequate for maintaining operation and for so long as thermostatic switch 145 remains closed to supply power to controller 149. In the event that threshold circuit 151 should determine that adequate power demand no longer exists (e.g., as a result of residential electrical loads being eliminated whereby the current $i_L$ flowing to the loads falls below a predetermined minimum justifying continued economical operation of the system) the output signal provided by means of lead 150 to controller 149 is interrupted. Similarly also, if the temperature should rise above the set point of thermostatic switch 145, AC power for controller 149 is terminated. In either event, controller 149 acts to terminate operation of the system by causing contacts 134 to open and by interrupting the power provided on lead 153 to fuel solenoid valve 15.

Operation of the system is, therefore, seen to be entirely automatic in nature, being self starting for initiation of operation and also self-terminating in operation if the power demanded drops below the predetermined value at which continued operation of the system is no longer economical. Such automatic operation does not require supervision of the householder or close moitoring, since the various safety features described above automatically terminate operation in the event of unsafe or abnormal conditions.

Figure 4:
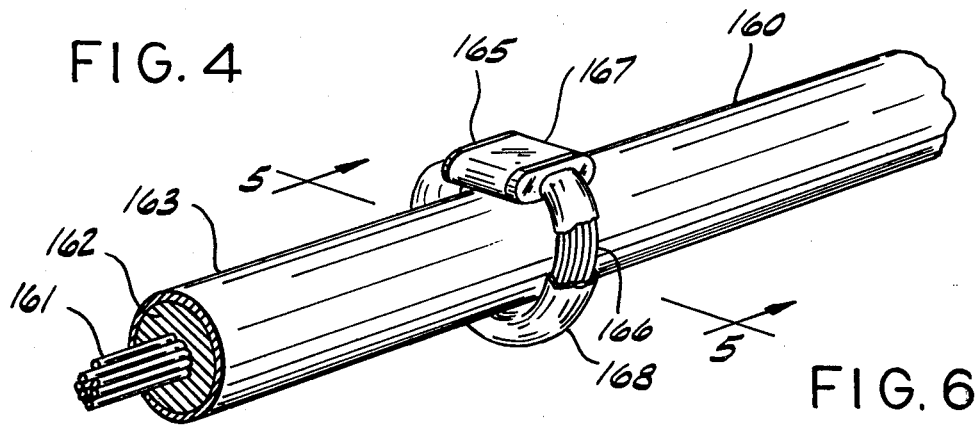
FIG. 4 is a perspective view depicting a current sensing transformer of the system in conjunction with an existing conductor which supplies conventional AC power from a utility service to a household electrical load.
Figure 6:
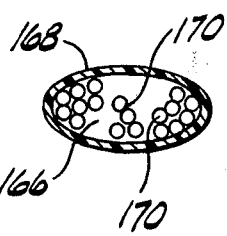
FIG. 6 is a cross-section taken along line 6—6 of FIG. 5, showing with even greater enlargement features of a core of the transformer.
Figure 5:
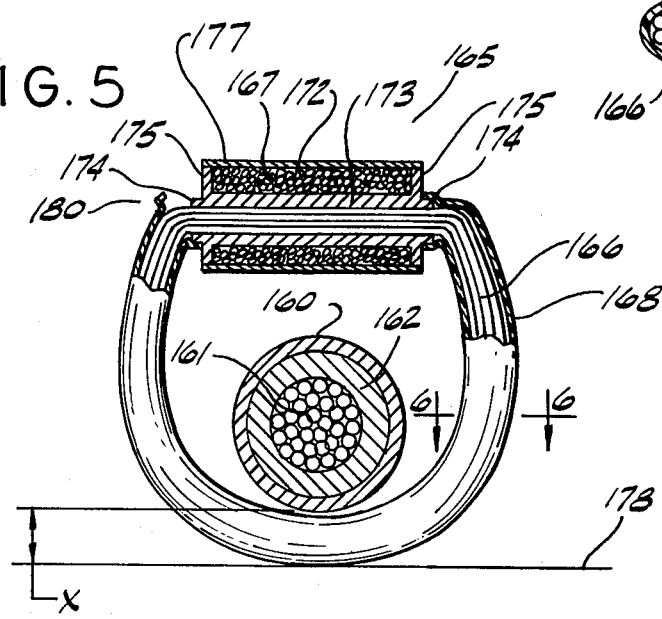
FIG. 5 is a transverse cross-section of the transformer taken generally along line 5—5 of FIG. 4, with dimensions being enlarged and exaggerated.

As noted in describing the circuitry of FIG. 3, both current magnitude sensing transformer 108 and current phase reference sensing transformer 105 each have a primary winding of a single turn constituted by the conductor through which AC electrical power is conducted. For this purpose, there has been invented a unique design for a small, compact and most easily installed transformer which can be utilized for both the previously noted purposes of sensing current magnitude and sensing the current phase. Referring to FIGS. 4-6, such a transformer of a configuration which may be utilized for constituting both transformers 105 and 108 of the circuitry of FIG. 3 is illustrated.

A cable 160 of the type utilized for providing the electrical utility power line connection to a residence is shown, it being understood that such cable comprises a relatively large conductive core 161 of copper or aluminum strands surrounded by insulation 162 and enclosed within a protective jacket 163. The cable may be of such large size as to provide typically for flow of as much as 60 or even more amperes of current. Manifestly, such cables are stiff and bulky and are not suited at being formed into a transformer winding. Also, cables of this type are often routed through a very confined space within a connection or junction box wherein there are fuses or circuit breakers so that there is extreme difficulty in even gaining access to the cable. Although great difficulties could, therefore, be expected to be encountered in connecting electrical apparatus to such cables, they are obviated in utilizing the new system by the provision of a transformer 165.

Transformer 165 is of annular configuration having a core 166 which encircles cable 160 whereby the conductor constitutes, in effect a single turn primary winding. Core 166 passes through a secondary winding 167 and is provided with an insulating jacket or cover 168. The new transformer 165 may be installed on a cable such as that indicated at 160 without requiring the cable to be disconnected from the house wiring or, indeed, without even requiring disturbance of the cable in any manner. For this purpose, core 166 is constituted of several stands (up to about ten or twenty) of iron core wire, as indicated in the cross-section of FIG. 6 at reference numeral 170. These strands are formed of a single length of relatively fine iron wire which is "sewn" or threaded into jacket 166 upon installation. The iron wire is preferably insulated to reduce eddy current losses and promote safe handling in proximity of electric power boxes having exposed contacts.

Referring the FIG. 5, secondary winding 167 comprises typically about 1,000 turns designated at 172 of fine copper wire prewound on a bobbin 173 of tubular configuration having projections 174 at opposite ends which extend axially beyond the flanged pieces 175 which retain the secondary winding 167. The turns 172 of fine copper wire are covered by insulating tape 177.

If desired, the projections 174 at the ends of the bobbin may be provided with teeth or serrations for enhancing retention thereon of the ends of cover 168. The latter is preferably of a resilient, flexible synthetic material such as polyvinyl chloride or other well-known electrical insulating materials. It may be formed so that its natural shape is semi-elliptical in cross-section, as shown in FIG. 6. This provides for certain advantages in installation as noted below but still permits the ends of the jacket 166 to be fitted readily over bobbin ends 174.

Installation is most easily accomplished. The flexible jacket or tube 166 is simply slipped around the power cable. In this regard, cable 160 may be located quite close to a surface as shown in 178 which may represent the back interior wall, for example, of a connection box wherein the cable is connected.

Cable 160 may, for example, be routed quite close to the back wall 178 of a junction box so that only a limited clearance X is available, perhaps measuring a small fraction of an inch. Or, the cable may lie against the surface 178 but can be pulled slightly away from the surface by distance X. The tubing jacket 168 is slipped behind cable 160 as indicated having one end fitted over the flanged projection 174 of the bottin carrying the secondary winding 167. The other end of the tubind ramains free of the opposite end of the bobbin as illustrated at 180. Then, using a flexible needle of known commercially available type, the iron core wire may be sewn through bobbin 173 and through the flexible tubular jacket 166, being passed time and again through bobbin 173 until up to about 20 turns of the iron wire are provided. Then, the free end of the tubular jacket 166 which has left an access space 180 is fitted onto he flanged projection 174 to completely enclose core 166. Because of the semi-elliptical shape of tubular jacket 168 as shown in FIG. 6, the distance x between cable 160 and surface 178 may indeed be quite small.

Since the new transformer 165 is intended for use only as a measuring instrument, its power rating may be rather low, e.g., typically one miliwatt, and thus only a few turns of iron wire threads are necessary to provide a core 166 having magnetic properties entirely satisfactory for magnetically coupling cable 160 to secondary winding 167.

The following examples illustrate the invention:

EXAMPLE I

Based upon an average household electrical power consumption of 0.585 kw for calendar year 1977 throughout all seasons, a system of the invention is constructed utilizing a gasoline inernal combustion engine running on natural gas and having a nameplate shaft horsepower rating of 1.75 hp. The engine has an operating speed range of 600–3,600 rpm. The engine drives an externally excited commutator AC motor-generator wherein the rotor has a commutator ring contacted by brushes for AC excitation of the rotor winding and with generated AC power being derived from the field winding. The drive arrangement includes a sheave-and-belt and meshed gears to turn the torot at 3,667 to about 22,000 rpm corresponding to the engine operating range. The motor-generator is adapted to generate 1.1 kw of AC electrical power on a continuous basis. At this rated output about 17,817 BTU/hour of raw available energy is present in the natural gas consumed by the engine. The system extracts and recovers about 8,017 BTU/hour of energy in the form of heated air, excluding the energy represented by continuously supplying 1.1 kw of AC electrical power to a substantially purely resistive household electrical load. The system optimizes the economical payoff to the householder in a household where the occasional electrical peak demand is 2.2–2.3 kw. An electric utility power line connected to the same electrical load supplies electrical power in excess of the maximum output (1.1 kw) of the system.

EXAMPLE II

A system is constructed in accordance with the invention as described in Example I with the exceptions that the engine has a nameplate shaft horsepower rating of 9.5 hp and an operating range of 400–3,200 rpm; the corresponding operating range of the motor-generator is from 1,750 to about 14,000 rpm and provides a maximum output to the resistive electrical load of 6 kw on a continuous basis. Natural gas supplied to the engine at this rated output has a raw available energy of about 96,723 BTU/hour. The system extracts and recovers about 43,925 BTU/hour of energy in the form of heated air, excluding the energy represented by continuously supplying 6 kw of AC electrical power to the load.

As is evidenced by the examples, the apparatus of the invention may be of such size and capacity that occasionally residential electrical load demand may exceed the rated maximum output capability of the machine. Such is not an undesirable attribute of the apparatus but rather is an advantageous trade-off resulting from optimization of the economics of constructing the system in a size wherein it may be economically constructed and thus acquired by the householder with a low cost-benefit ratio. If the system were intended to provide 100% of the power demanded by the electrical loads where the system is installed, under all conditions, its size and capacity would be considerably greater in view of the possible brief peak demand with consequent high cost and scaling up of size. But within the operational limits of the new system, its operation as described hereinabove substantially meets most, if not quite all, of the electrical power demanded by household electrical loads entirely automatically and without supervision. It is also preferred that forward gains and feedback gains, as well as control loop time constants characteristic of the new system, be such as will provide stable automatic current control even during the occurrence of normal voltage variations (e.g., 117±5 VAC) on the electrical power line as well as expected increases or reductions in electrical loads which may result from the householder switching on or off appliances, etc.

The system can be set to operate only when actual ambient air temperature is below a point at which useful and economical operation of the apparatus will result, assuming that thermostatic switch 145 has been set appropriately by the householder to preclude such operation. If the temperature is less than that which thermostatic switch 145 will preclude operation of the system, the system automatically starts in response to demand by the household loads of predetermined magnitude. The threshold circuitry 151 precludes, however, automatic initiation of system operation in the event that the electric demand is miniscule (such as a few watts of power which may be required by pilot lights, electric clocks and other small electrical loads) thereby preventing needless wear and tear on the system.

Although it is contempated that the system may utilize one of various hydrocarbon fuels such as natural gas, gasoline, kerosene, LP gas, alcohol, or mixtures of these or various other fuels suitable for internal combustion engine types operating on the Otto cycle, or may utilize kerosene or fuel oil if the engine operates on the Diesel cycle, the engine may be either of two cycle or four cycle design and may be of either reciprocating or rotary (such as Wankel) design. A gas turbine engine could be employed if of sufficiently economical construction.

Also, while it is disclosed that motor-generator 34 is of the type having brushes, it is possible and indeed may be desirable to utilize a motor-generator of the externally excited type herein disclosed which is of a brushless design where, for example, exceptionally long maintenance-free operating life is requisite or where the engine-generator is to be operated in a potentially explosive ambient environment such as in the vicinity of petroleum handling, munitions production, or around chemical plants.

Moreover, although acoustical and thermal insulation is employed in constructing enclosure 11, which is of double-walled character, it should be appreciated that such acoustical and thermal insulation as well as the various vibration isolators may not be needed if the ambient environment is temperate and if noise and/or vibration resulting from operation of the system would not be objectionable, as in certain kinds of industrial facilities.

The system has been disclosed as utilizing a counterflow heat exchanger 60. But, it should be recognized that a forward-flow heat exchanger may instead be utilized with somewhat reduced thermodynamic efficiency and may, in fact, be preferable if it is desired that heat exchanger size, weight, and material content are to be reduced to absolute minima.

Whereas the placement of transformers 105 and 108 in FIG. 3 fully reveals their function, alternative arrangements are possible. For example, utility line current can be determined as load current $i_L$ minus generated $i_D$ in which case transformer 105 primary winding 99 can be installed in lead 133.

While it is preferred to derive AC power for starting of the system by powering the motor-generator 34 with AC power available from utility service, start-up power for the system may be derived from a direct current battery integrated into a power supply rather than from utility power lines. The commutator AC motor-generator is well adapted to operate on DC. Of course, completely automatic and autonomous operation independent of an electrical utility power source can be obtained if a battery is included to provide start-up, for example, where intended that the system provide not only AC power on a supplemental basis but also in the event of failure of the electric utility power source. In this event, voltage reference (nominally 120 VRMS) and frequency reference (nominally 60 hertz) would be provided by standards internal to the system.

Furthermore, although the system is disclosed as providing AC power at 60 hertz, operation may be at other frequencies such as 50 hertz or 25 hertz utilized in other countries, or may be at 400 hertz, as in military and aviation uses. Moreover, the system may be configured to produce additional voltages or alternative phase relationships such as 220 volts, 2-phase or 208 volts, 3-phase.

Whereas the preferred embodiment illustrates a single common electrical ground for both electric power lines and control circuits, separate grounds are easily provided by replacing resistor R10 with a current transformer and deriving the voltage phase signal otherwise provided from lead 101 from a power supply transformer secondary winding.

Further modifications are also possible in connection with the mechanical drive arrangement which interconnects engine 12 with motor-generator 34. Although a step-up arrangement is preferred, it is also possible to provide direct shaft interconnection between the engine and motor-generator but the engine and motor-generator angular velocity will, in any event, vary in accordance with the amount of supplemental AC power being generated at any given moment.

In the preferred embodiment, the motor-generator is shown employed in a manner in which the rotor (armature) is excited. However, the functions of the stator (field) and rotor of the motor-generator may be reversed in applications where the power line voltage is such that the ease of providing electrical insulation and prolongation of life of the motor-generator brushes would be obtained. But, in any event, the brush-commutated motor-generator 34 operates at speeds different from and even several times greater than the so-called "synchronous speed" of the conventional AC synchronous alternating current motor-alternators. As stated, the speed of operation of the motor-generator may be in tens of thousands of revolutions per minute. Accordingly, there is realized great conservation of electrical winding materials (e.g., copper wire) as well as greatly reduced amounts of magnetic core material (e.g., iron).

It is not intended that the motor-generator utilized in the preferred embodiment be utilized only for the purposes of generating AC power. If desired, such motor-generator may be modified to generate DC current. If DC current output is desired for specialized applications, the excitation circuits which supply current to the rotor for excitation thereof may be appropriately varied to include contacts for direct current windings which may be provided in the motor-generator.

The numerous advantages of the system are immediately recognizable. The subject invention can be utilized effectively to reduce the cost of energy purchases to about one-third of previous costs in temperate climates and more reduction in frigid climates, taking note of the fact that much valuable thermal energy involved in converting hydrocarbon fuels to commercial electrical power is irretrievably lost, compared to the new system wherein most of such heat is efficiently recovered for useful purposes.

Therefore, it will be well appreciated that electricity generated by the system can be utilized as a direct substitute for electric power that otherwise would be required to be purchased from an electric utility or supplied by means of some other large electric power plant. The heat generated as a concomitant by-product of generating electricity by the system is recaptured and utilized for most desirable purposes, such as the heating of living and sleeping quarters, work spaces, or other locations where warmth is desired, such as in greenhouses, food processing operations, and in general manufacturing. All or part of the heat generated as a by-product of generating electricity by the system can be utilized to heat water or other fluids in domestic, commercial, or industrial applications, especially in summertime when space heating is less wanted.

Although the foregoing demonstrates the wide possibilities of usage of the new system, it ought to be recognized that the system may be utilized solely as a highly efficient means for transporting energy released by the combustion of hydrocarbon fuel to remote and distant locations, where normal transmission methods such as the conveyance of heated fluid (such as air, water or steam) would suffer large and costly energy losses due to unwanted stray conduction, convection and radiation. The new system may, in fact, be utilized to transport a substantial portion of the energy released by the combustion of hydrocarbon fuel in the form of electricity with great efficiency over many thousands of feet as to remote chicken houses, servants quarters and the like whereas the energy normally released from the combustion of hydrocarbon fuels can be transported but a few hundred feet.

Above all else, the new system maximizes the value, satisfaction, and flexibility of use derivable from the combustion of hydrocarbon fuels.

Although the foregoing includes a description of the best mode contemplated for carrying out the invention, various modifications in addition to those noted are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An energy conversion system for independently supplying demand-controlled supplemental AC electrical power continuously upon demand to an electrical load in electrical phase synchronism with, simultaneously with, and in parallel with an operating, existing source of AC electrical power, said system comprising commutator AC generator means operating at an controllably variable shaft speed unrelated to the frequency of said existing source of AC electrical power, a prime mover for operating said commutator AC generator means, said prime mover being controllable to vary the magnitude of the available mechanical shaft power thereof to produce a controllably variable shaft speed of said commutator AC generator means which shaft speed is unrelated to the frequency of said existing source of AC electrical power, said commutator AC generator means being adapted to generate supplemental AC power for delivery to said electrical load for satisfying AC power requirements of said electrical load, exciter means for exciting said commutator AC generator means proportional to the magnitude of in-phase real power demand of said electrical load regardless of the controllably variable shaft speed of said commutator AC generator means, electrical load current demand sensor means, independent from said operating, existing source of AC power, for providing a demand control signal which is proportional to the magnitude of in-phase real power demand of said electrical load, first control means interconnected with said prime mover for controlling the production of available mechanical shaft power by said prime mover in proportion to the magnitude of in-phase real power demand of said electrical load, and second control means interconnected with said exciter means for controlling the degree of excitation of said commutator AC generator means to cause the electrical power output thereof to substantially meet and be continually responsive to the magnitude of in-phase real power demand of said electrical load regardless of the mechanical shaft power produced by said prime mover and regardless of the controllably variable shaft speed of said commutator AC generator means.

2. An energy conversion system as defined in claim 1, said first control means operating continuously to cause variation in the production of available shaft power by said prime mover for producing corresponding variation in shaft speed of said commutator AC generator means, whereby said shaft speed is adequate for providing mechanical energy sufficient for said commutator AC generator means continuously to satisfy power requirements of said electrical load as said requirements may vary.

3. An energy conversion system as defined in claim 2, said shaft speed being subject to substantial variation and being entirely independent of conventional AC generator synchronous speed.

4. An energy conversion system as defined in claim 3 wherein said commutator AC generator means has a shaft speed substantially greater than said synchronous speed whereby said generator means requires a minimum of electrical winding materials and reduced amounts of magnetic core material.

5. An energy conversion system as defined in claim 1 wherein said system is autonomous from said existing source of AC electrical energy.

6. An energy conversion system as defined in claim 1 and further comprising means for automatically limiting said first and second control means to prevent further increase is available mechanical shaft power provided by said prime mover and to prevent further increase in the generation of supplemental AC power by said commutator AC generator means, whereby AC electrical power requirements of said electrical load in excess of a predetermined maximum produced by said system are provided by said existing source of AC electrical power.

7. An energy conversion system as defined in claim 1, said system, said existing source of AC electrical energy, and said electrical load all being connected to a single node, said existing source comprising a commercial AC electrical utility service line.

8. An energy conversion system as defined in claim 7 and further comprising abnormal voltage sensing means for sensing voltage at said node for terminating operation of said voltage if said voltage is abnormal.

9. An energy conversion system as defined in claim 1 and further comprising load demand threshold means for initiating operation of said system upon the AC power requirements of said electrical load exceeding a predetermined threshold.

10. An energy conversion system as defined in claim 9 wherein said prime mover is an internal combustion engine and further comprising means, responsive to said load demand threshold means, for initiating starting of said engine upon said AC power requirements exceeding said predetermined threshold.

11. An energy conversion system as defined in claim 10 wherein said means for initiating starting is operative to cause said commutator AC generator means to operate as a motor initially for starting said engine, and further comprising means for causing said commutator AC generator means to revert to generation of supplemental AC power for delivery to said electrical load upon said engine reaching a predetermined speed.

12. An energy conversion system as defined in claim 10 and further comprising means for causing re-initiation of starting of said engine if said engine fails to reach a predetermined speed within a time delay interval.

13. An energy conversion system as defined in claim 1 and further comprising power distribution means interconnecting said load and said existing source of AC electrical energy, and phase sensitive detector means operatively associated with said power distribution means for sensing voltage-current phase relationship of AC electrical energy supplied from said existing source to said load, said phase sensitive detector means being operative for controlling said exciter means in a sense for preventing flow of electrical power from said system to said existing source.

14. An energy conversion system as defined in claim 13, said system, said existing source of AC electrical energy, and said electrical load all being connected to a single node, said system comprising a power distribution cable interconnecting said node and said existing source of AC electrical energy, said phase sensitive detector having voltage reference and current inputs, said node providing said voltage reference input, and a current transformer associated with said power lead for sensing current flowing between said existing source of AC electrical energy and said node, said current transformer providing said current input.

15. An energy conversion system as defined in claim 1, said existing source of AC electrical energy being interconnected with said load by a power distribution cable, said electrical load demand sensor means comprising a current transformer having a flexible, pliable core of flexible, threadlike ferromagnetic strands which can be shaped to fit through a confined, irregularly shaped access space around said cable without need to disturb or disconnect said cable during installation of said core, said core surrounding said cable, said cable constituting a single turn primary winding, said transformer having a secondary winding having numerous turns wound around said core and providing a voltage proportional to the magnitude of current passing through said cable.

16. An energy conversion system as defined in claim 1 and further comprising means for recovering thermal energy expended in the operation of said system and for providing flow of heated air from said system for utilization of said recovered thermal energy, including means for directing air for cooling of said commutator AC generator means, a fan for causing movement of said air, and means for ducting said air from said system, said air being heated by cooling of said commutator AC generator means.

17. An energy conversion system as defined in claim 16, said means for recovering thermal energy further including an enclosure for enclosing at least said commutator AC generator means, said enclosure providing thermal isolation from the environment external to said system, said air being drawn into said enclosure for cooling of said commutator AC generator means by said fan, said air being directed out of said enclosure after being heated, and thermostatic means for permitting operation of said system only upon the ambient temperature of said external environment falling below a predetermined threshold temperature.

18. An energy conversion system as defined in claim 1, said second control means comprising generated current sensing means for providing a current feedback signal the magnitude of current generated by said commutator AC generator means, and means for comparing said demand control signal with said current feedback signal and interconnected with said exciter means to control the degree of excitation of an exciter winding of said commutator AC generator means.

19. An energy conversion system as defined in claim 18, said exciter means comprising bipolar solid state control means constituting a controllable resistance and connected in a series circuit with said exciter winding, for controlling the magnitude of AC current supplied to said exciter winding, said series circuit including an AC voltage source providing an excitation voltage in phase synchronism with said existing AC source, said second control means comprising a differential amplifier adapted for comparing the difference between said current feedback signal and said demand control signal, said differential amplifier having an output controlling said solid state control means to effectively vary the magnitude of said controllable resistance as a function of the difference between said current feedback signal and said demand control signal.

20. An energy conversion system as defined in claim 19 and further comprising filter means for filtering said demand control signal to prevent rapid reduction thereof for rapidly reducing excitation of said exciter winding in response to reduction of the AC power requirements of said AC load and for permitting slower increase of said demand control signal for slower increase of the excitation of said exciter winding in response to increase of the AC power requirements of said load.

21. An energy conversion system for converting hydrocarbon combustion energy to AC electrical energy for independently supplying demand-controlled supplemental AC electrical power continuously upon demand to an electrical load in electrical phase synchronism with, simultaneously with, and in parallel with an operating, existing source of AC electrical power, said system comprising commutator AC generator means operating at a controllably variable shaft speed unrelated to the frequency of said existing source of AC electrical power, power distribution means interconnecting said system with said existing source of AC electrical power and with said electrical load, a hydrocarbon fueled prime mover for operating said commutator AC generator means, said prime mover being controllable to vary the magnitude of the available mechanical shaft power thereof to produce a controllably variable shaft speed of said commutator AC generator means which shaft speed is unrelated to the frequency of said existing source of AC electrical power, said commutator AC generator means being adapted to generate supplemental AC power for delivery to said electrical load for satisfying AC power requirements of said electrical load, exciter means for exciting said commutator AC generator means proportional to the magnitude of in-phase real power demand of said electrical load regardless of the controllably variable shaft speed of said commutator AC generator means, electrical load current demand sensor means, independent from said operating, existing source of AC power, for providing a demand control signal which is proportional to the magnitude of in-phase real power demand of said electrical load, first control means, including a prime mover output speed feedback loop, interconnected with said prime mover for controlling the production of available mechanical shaft power by said prime mover in proportion to the magnitude of in-phase real power demand of said electrical load, and second control means, including a generated current feedback loop, interconnected with said exciter means for controlling the degree of excitation of said commutator AC generator means to cause the electrical power output thereof to substantially meet and be continually responsive to the magnitude of in-phase real power demand of said electrical load regardless of the mechanical shaft power produced by said prime mover and regardless of the controllably variable shaft speed of said commutator AC generator means, phase sensitive detector means, operatively associated with said power distribution means, for sensing voltage-current phase relationship of AC electrical power provided by said existing source to said electrical load by said power distribution means, and adapted for generating an error signal which is a function of said voltage-current phase relationship, and signal summer means for summing said error signal and said demand control signal, the summed signals being provided to said second control means for nullifying voltage-current phase errors resulting from operation of said system or for preventing flow of AC electrical power from said system to said existing source.

* * * * *